United States Patent
Drummond et al.

(10) Patent No.: US 6,591,932 B1
(45) Date of Patent: Jul. 15, 2003

(54) SENSING SYSTEM FOR VEHICLE PASSIVE RESTRANTS

(76) Inventors: J. B. Drummond, 23040 Bittersweet, Southfield, MI (US) 48034; Mukesh J. Amin, 41453 Greenwood Dr., Canton, MI (US) 48187

( * ) Notice: Subject to any disclaimer, the term of this patent is extended or adjusted under 35 U.S.C. 154(b) by 245 days.

(21) Appl. No.: 09/216,768

(22) Filed: Dec. 21, 1998

(51) Int. Cl.[7] .............................................. B60K 28/14
(52) U.S. Cl. ..................................... 180/282; 280/735
(58) Field of Search ................................ 280/734, 735, 280/806; 180/282, 268; 73/504.16

(56) References Cited

U.S. PATENT DOCUMENTS

| | | | | |
|---|---|---|---|---|
| 4,443,729 A | * | 4/1984 | Rider .......................... | 310/330 |
| 5,010,775 A | * | 4/1991 | Choisnet ................... | 73/862.33 |
| 5,173,614 A | * | 12/1992 | Woehrl et al. .............. | 280/734 |
| 5,316,336 A | * | 5/1994 | Taguchi et al. .............. | 280/730 |
| 5,348,342 A | * | 9/1994 | Haland et al. ............... | 280/734 |
| 5,522,249 A | * | 6/1996 | Macy ....................... | 73/504.16 |
| 5,602,734 A |   | 2/1997 | Kithil | |
| 5,673,932 A | * | 10/1997 | Nitschke et al. ............. | 280/735 |
| 5,749,059 A |   | 5/1998 | Walton | |
| 5,785,347 A | * | 7/1998 | Adolph et al. ............... | 280/735 |
| 5,788,281 A | * | 8/1998 | Yanagi et al. ................ | 280/735 |
| 5,826,216 A | * | 10/1998 | Lyons et al. ................. | 702/143 |
| 6,104,284 A | * | 8/2000 | Otsuka ....................... | 340/440 |
| 6,113,138 A | * | 9/2000 | Hermann et al. ............ | 280/735 |

* cited by examiner

*Primary Examiner*—Brian L. Johnson
*Assistant Examiner*—J. Allen Shriver

(57) ABSTRACT

A sensing system for vehicle passive restraints including a restraints control module (38) in communication with a frontal impact accelerometer (40) and a pair of side impact sensors (46) mounted remotely in satellite sensor housings (44). Also mounted within one of the satellite housings (44) is a roll rate sensor (52), employing a common communication link (48) with one of the side impact sensors (46), for communicating with the restraints control module (38).

20 Claims, 1 Drawing Sheet

SENSING SYSTEM FOR VEHICLE PASSIVE RESTRANTS

FIELD OF THE INVENTION

The present invention relates to sensor systems employed for determining actuation of safety restraints in a vehicle and more particularly for sensor systems that detect possible rollover conditions of a vehicle.

BACKGROUND OF THE INVENTION

Conventional passive restraints systems are generally configured with a sensor system set up to detect frontal collisions of a vehicle and actuate passive restraints to better protect the occupants. More recently, the sensor systems are set up to also detect certain side impact situations and the passive restraints are configured to protect passengers for these side impact situations as well. For the frontal impacts, a common sensing system includes a single point impact sensor that is mounted near the center of the vehicle and oriented to detect fore-aft (longitudinal) acceleration of the vehicle, and employs this signal to determine when and which passive restraints to actuate. These may be, for example, front airbags or seat belt pretensioners.

Additionally, in order to now detect side impacts of the vehicle, some sensor systems employ side satellite sensors that are oriented to detect side-to-side (lateral) acceleration of the vehicle. These side satellite sensors are typically mounted in or near the side doors of the vehicle to obtain an earlier detection of a side impact than a centrally mounted acceleration sensor might. These side satellite sensors are then electrically connected to a restraints control module, along with the single point impact sensor. This necessitates separate housings and wiring for each of the satellite sensors, with the associated costs and packaging concerns.

An additional type of sensing for vehicle passive restraint actuation is now becoming more desirable, rollover detection. A roll rate sensor, unlike typical frontal and side impact sensors, measures a vehicle's angular position with respect to the ground or the rate of change in angular position over time. By measuring one of these types of physical parameters, passive restraints may be deployed specifically to provide protection for vehicle occupants under certain vehicle rollover conditions. The typical accelerometers employed for frontal and side impacts are generally not suitable for such use; even if oriented properly, the output needs to be subjected to exhaustive calculations before actuation decisions can be made. On the other hand, by adding a separate roll rate sensor, packaging and wiring for this additional sensor is now a concern in addition to the cost.

SUMMARY OF THE INVENTION

In its embodiments, the present invention contemplates a sensor system for use with passive restraints in a vehicle having a longitudinally directed vehicle centerline. The sensor system includes a longitudinal impact sensor located generally adjacent the longitudinally directed vehicle center line, and a restraints control module in communication with the longitudinal impact sensor. A first satellite sensor housing is mounted in the vehicle spaced from the restraints control module, and a lateral impact sensor is mounted in the satellite sensor housing and in communication with the restraints control module via a first communication link. The sensor system also includes a roll rate sensor mounted in the satellite sensor housing and in communication with the restraints control module via the first communication link.

Accordingly, an object of the present invention is to provide a passive restraint sensing system that includes both frontal impact sensors located near or in a main restraints control module as well as side satellite sensor housings that also incorporate a rollover detection sensor.

An advantage of the present invention is that the rollover sensor is incorporated into a side satellite sensor housing, minimizing the need for extra wiring and packaging another housing, thus reducing the cost of the overall sensor system.

Another advantage of the present invention is that the cost and complexity of the sensor system is reduced, while still providing the additional function of vehicle rollover detection.

DETAILED DESCRIPTION OF THE PREFERRED EMBODIMENTS

Figure 1:
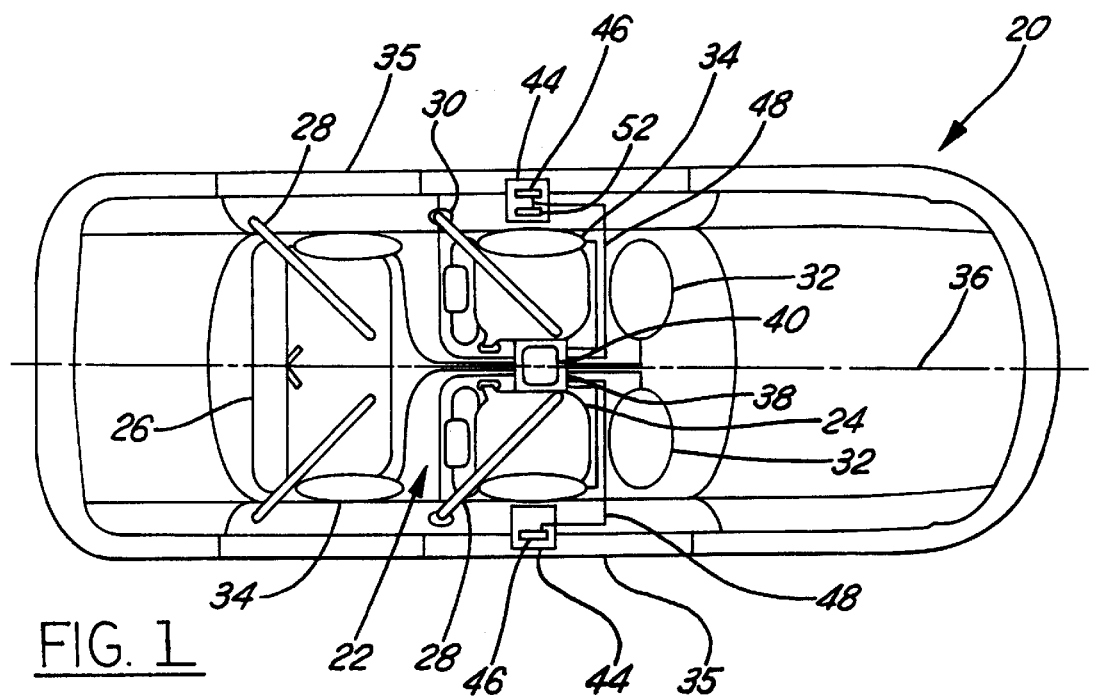
FIG. 1 is a schematic plan view of a vehicle including the passive restraints sensor system in accordance with the present invention.
Figure 2:
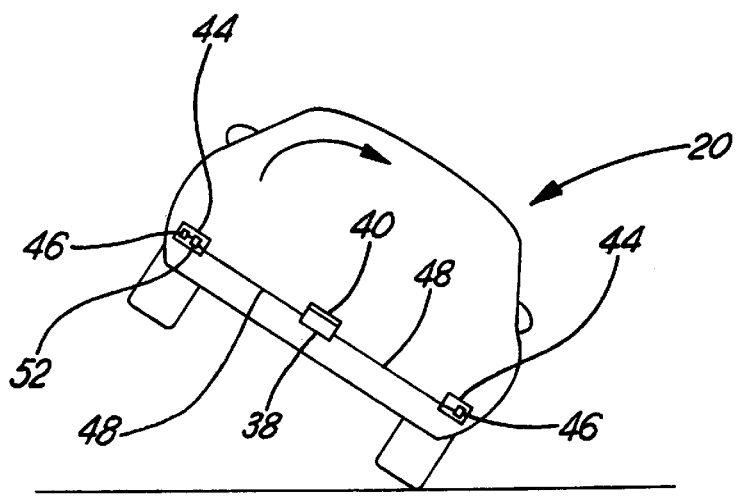
FIG. 2 is a schematic rear view of a vehicle in accordance with the present invention.

FIGS. 1–2 illustrate a vehicle 20 including a passenger compartment 22 having front 24 and rear 26 seats therein. Each of the seats includes a seat belt 28, where each seat belt may be equipped with pretensioners 30. Mounted forward of the front seats 24 are front airbags 32 and adjacent the sides of the front 24 and rear 26 seats are side airbags 34, designed to inflate between vehicle occupants and vehicle doors 35. While three different types of passive restraint devices, i.e., front airbags 32, side airbags 34 and seat belt pretensioners 30, are illustrated herein, there may only be one or two of these types of passive restraints on a given vehicle. The present invention is able to be applied to any of these passive restraints.

Also mounted within the vehicle is a restraints control module 38, for analyzing sensor data and determining passive restraints deployment. This module 38 is typically mounted near or at the centerline 36 of the vehicle 20. A frontal accelerometer 40 is oriented to sense longitudinal (fore-aft) acceleration of the vehicle 20 for frontal impact situations and supply a signal indicating such to the restraints control module 38. The frontal accelerometer 40 is preferably mounted adjacent to or in the housing of the restraints control module 38. The sensing system for the passive restraints also includes lateral (side-to-side) impact sensing. A pair of satellite sensor housings 44 are mounted in the vehicle 20 near or in the side doors 35. Within each of the satellite housings 44 is a side impact accelerometer 46, oriented to sense lateral acceleration of the vehicle 20 for side impact situations. Each side accelerometer 46 is connected to wiring 48 extending to the restraints control module 38 and communicates acceleration data or a deployment signal to the module 38.

A roll rate sensor 52 is incorporated into one of the side satellite sensor housings 44 alongside the side impact sensor 46. Communication for both sensors to the control module 38 is then accomplished via the common communication link 48. By doing this, the roll rate sensor 52 will not require a separate housing, or additional mechanical hardware, being able to share the existing electronic hardware from the existing side impact sensor 46. The roll rate sensor 52 measures angular rotation and may be, for example, a vibrating tuning fork or a vibrating ceramic rod, which may be incorporated in a micromachined sensor. Vibrating tuning fork and vibrating ceramic rod devices are well known in the inertial sensor art, examples of which are disclosed in U.S Pat. Nos. 5,522,249 and 4,443,729 respectively. The angular rotation and/or rate information output by the roll rate sensor 52 is communicated to the control module 38 and is used, in a manner well known in the art, to determine whether a vehicle rollover condition exists.

While certain embodiments of the present invention have been described in detail, those familiar with the art to which this invention relates will recognize various alternative designs and embodiments for practicing the invention as defined by the following claims.

We claim:

1. A sensor system for use with passive restraints in a vehicle having a longitudinally directed vehicle centerline, the sensor system comprising:
   a longitudinal impact sensor located generally adjacent the longitudinally directed vehicle centerline;
   a restraints control module in communication with the longitudinal impact sensor;
   a first satellite sensor housing mounted in the vehicle spaced from the restraints control module;
   a lateral impact sensor mounted in the satellite sensor housing and in communication with the restraints control module via a first communication link; and
   a roll rate sensor mounted in the satellite sensor housing and in communication with the restraints control module via the first communication link.

2. The sensor system of claim 1 further including a second satellite sensor housing mounted in the vehicle spaced from the first restraints control module, and a second lateral impact sensor mounted in the second satellite sensor housing and in communication with the restraints control module via a second communication link.

3. The sensor system of claim 2 wherein the first satellite sensor housing is mounted on a first side of the vehicle centerline and the second satellite sensor housing is mounted on a second side of the vehicle centerline.

4. The sensor system of claim 3 wherein the first satellite sensor housing is adapted to be mounted in a first vehicle side door and the second satellite housing is adapted to be mounted in a second vehicle side door.

5. The sensor system of claim 4 wherein the roll rate sensor is a vibrating tuning fork sensor that is adapted to sense rotational motion of the vehicle about an axis that is in a direction generally parallel with the vehicle centerline.

6. The sensor system of claim 1 wherein the longitudinal impact sensor is mounted to the restraints control module.

7. The sensor system of claim 1 wherein the roll rate sensor is a vibrating ceramic rod sensor that is adapted to sense rotational motion of the vehicle about an axis that is in a direction generally parallel with the vehicle centerline, said sensed rotational motion being used by the control module to determine whether a vehicle rollover condition exists.

8. A sensor system for use with passive restraints in a vehicle having a longitudinally directed vehicle centerline, the sensor system comprising:
   a longitudinal impact sensor located generally adjacent the longitudinally directed vehicle centerline;
   a restraints control module in communication with the longitudinal impact sensor;
   a first satellite sensor housing mounted in the vehicle spaced from the restraints control module;
   a lateral impact sensor mounted in the satellite sensor housing and in communication with the restraints control module via a first communication link; and
   a vibrating tuning fork sensor, mounted in the satellite sensor housing and in communication with the restraints control module via the first communication link, and adapted to sense rotational motion of the vehicle in a direction generally parallel with the vehicle centerline.

9. The sensor system of claim 8 further including a second satellite sensor housing mounted in the vehicle spaced from the first restraints control module, and a second lateral impact sensor mounted in the second satellite sensor housing and in communication with the restraints control module via a second communication link.

10. The sensor system of claim 9 wherein the first satellite sensor housing is adapted to be mounted in a first vehicle side door and the second satellite housing is adapted to be mounted in a second vehicle side door.

11. The sensor system of claim 8 wherein the longitudinal impact sensor is mounted to the restraints control module.

12. A vehicle with a passive restraints system and a longitudinally directed vehicle centerline comprising:
   a seat mounted in the vehicle;
   a passive restraint located proximate the seat;
   a longitudinal impact sensor located generally adjacent the longitudinally directed vehicle centerline;
   a restraints control module in communication with the longitudinal impact sensor and with the passive restraint;
   a first satellite sensor housing mounted in the vehicle spaced from the restraints control module;
   a lateral impact sensor mounted in the satellite sensor housing and in communication with the restraints control module via a first communication link; and
   a roll rate sensor mounted in the satellite sensor housing and in communication with the restraints control module via the first communication link.

13. The vehicle of claim 12 further including a second satellite sensor housing mounted in the vehicle spaced from the first restraints control module, and a second lateral impact sensor mounted in the second satellite sensor housing and in communication with the restraints control module via a second communication link.

14. The sensor system of claim 13 wherein the first satellite sensor housing is mounted in a first vehicle side door and the second satellite housing is mounted in a second vehicle side door.

15. The sensor system of claim 12 wherein the longitudinal impact sensor is mounted to the restraints control module.

16. The sensor system of claim 12 wherein the roll rate sensor is a vibrating ceramic rod sensor for sensing rotational motion of the vehicle about an axis that is in a direction generally parallel with the vehicle centerline, said sensed rotational motion being used by the control module to determine whether a vehicle rollover condition exists.

17. The sensor system of claim 16 wherein the passive restraint is a seat belt pretensioner.

18. The sensor system of claim 12 wherein the passive restraint is a seat belt pretensioner.

19. The sensor system of claim 12 wherein the passive restraint is an air bag mounted forward of the seat.

20. The sensor system of claim 12 wherein the passive restraint is an air bag mounted between the seat and a side door of the vehicle.

* * * * *